United States Patent [19]

Rasmussen

[11] 4,288,423
[45] Sep. 8, 1981

[54] METHOD OF RECOVERING METALLIC TELLURIUM

[75] Inventor: Hans W. Rasmussen, St. George, Utah

[73] Assignees: Clarence E. Hulbert, Jr.; O. W. Coburn, both of Muskogee, Okla.

[21] Appl. No.: 168,759

[22] Filed: Jul. 11, 1980

[51] Int. Cl.$^3$ .................... C01B 19/02; C01G 21/20
[52] U.S. Cl. .................... 423/510; 423/92; 423/95; 423/140; 423/146; 423/558; 423/559; 75/25; 75/99; 75/120
[58] Field of Search .................... 423/508–510, 423/558, 559, 92, 95, 140, 146; 75/25, 99, 120

[56] References Cited

U.S. PATENT DOCUMENTS

| | | | |
|---|---|---|---|
| 2,039,256 | 4/1936 | Martin et al. | 423/32 X |
| 2,076,738 | 4/1937 | Martin et al. | 423/510 |
| 3,387,928 | 6/1968 | Doumas | 423/510 X |
| 3,560,154 | 2/1971 | Jueschke et al. | 423/509 X |
| 3,969,495 | 7/1976 | Dreyfuss | 423/510 X |

*Primary Examiner*—Earl C. Thomas
*Attorney, Agent, or Firm*—William S. Dorman

[57] ABSTRACT

A method of recovering metallic tellurium from a residue dust containing a major amount of lead oxide, a minor amount of tellurium oxide, and a minor amount of iron oxide which comprises the steps of introducing the residue into a leach tank containing water, sulphuric acid and ferric sulphate, the sulphuric acid being present in the leach tank in an amount equal to about 5% to 10% by weight in excess of that stoichiometrically required to react with the lead and tellurium, the ferric sulphate being added as an oxidizing agent, reacting the residue with the sulphuric acid and ferric sulphate to produce lead sulphate and a tellurium solution, removing the lead sulphate and tellurium solution from the leach tank and separating the lead sulphate from the tellurium solution, adding the separated tellurium solution to a tumbler containing particles of metallic iron, agitating the tumbler so that the tellurium solution reacts with the iron to produce ferrous sulphate and metallic tellurium, withdrawing the mixture of ferrous sulphate and metallic tellurium from the tumbler and separating out the ferrous sulphate to recover essentially pure metallic tellurium.

6 Claims, 1 Drawing Figure

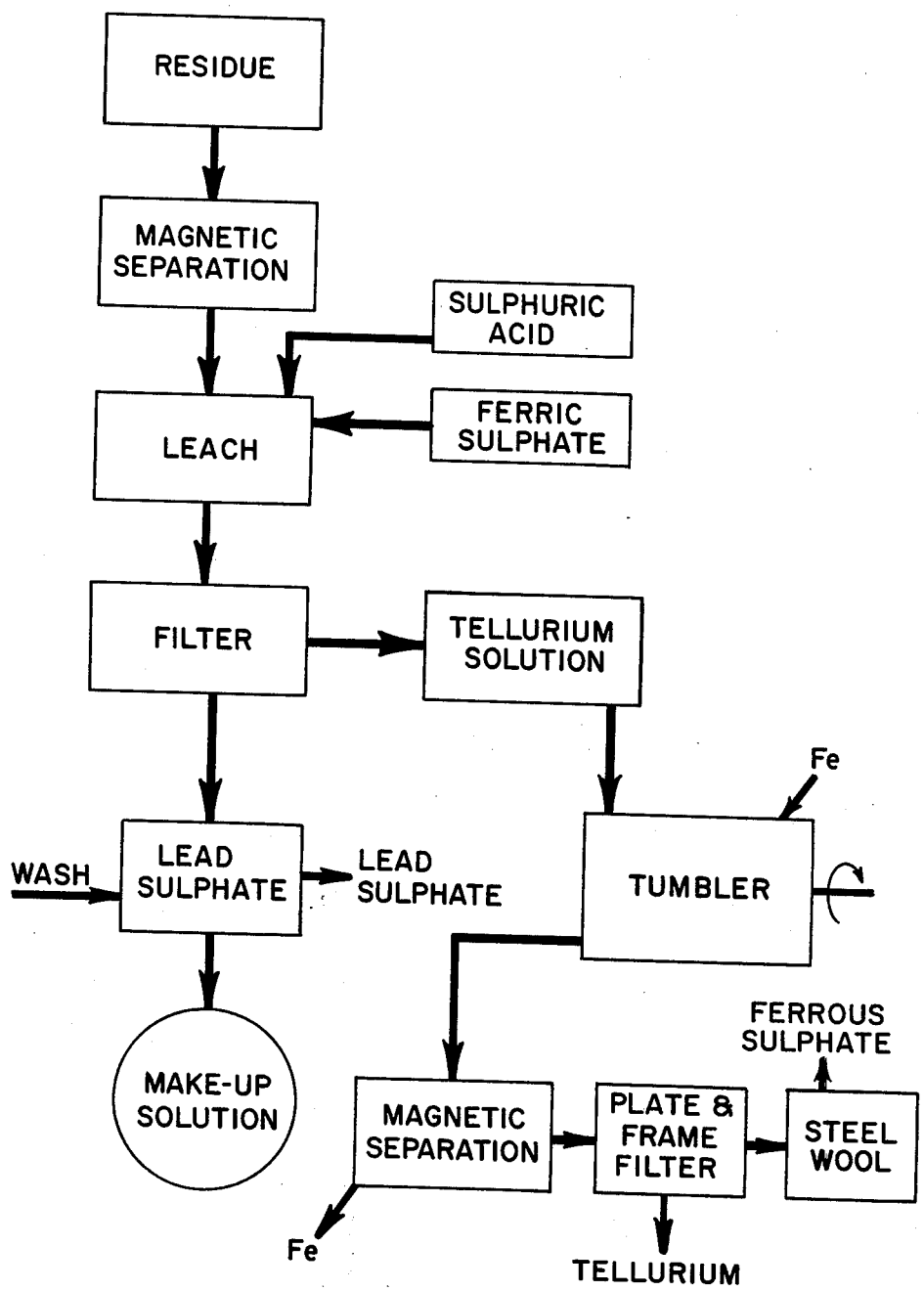

4,288,423

METHOD OF RECOVERING METALLIC TELLURIUM

BACKGROUND OF THE INVENTION

1. Field of the Invention

The present invention relates to the treatment of a residue dust containing lead oxide and tellurium oxide; more particularly this invention pertains to the recovery of metallic tellurium from the residue dust.

2. Prior Art

In the steel industry, it has been discovered that the addition of small amounts of tellurium to low carbon and alloy steels will greatly improve the machinability of these metals. One currently employed method of adding tellurium to steel involves covering a molten bath of steel with a layer of molten lead. Tellurium is then added to the layer of molten lead, after which a certain amount of tellurium migrates into the molten steel. However, at the time of adding the tellurium, there is a considerable amount of spattering, flashing, etc., the resulting products of which are recovered as flue dust. Because of the relative scarcity of tellurium, the industry is interested in recovering tellurium from this flue dust. Numerous methods for recovering tellurium have been proposed and some put into practice, but, for the most part, these methods are not wholly satisfactory.

As far as the patented art is concerned, Doumas U.S. Pat. No. 3,387,928 involves the acid leaching of tellurium and selenium in the presence of an organic medium. U.S. Pat. No. 3,560,154 to Jueschke discloses applying oxidizing agents, then applying acid to a mass containing tellurium and selenium to isolate the tellurium and selenium. Dreyfuss, U.S. Pat. No. 3,969,495 discloses a thermochemical reaction involving the generation of hydrogen from water using a metalloid such as tellurium with the subsequent regeneration of the tellurium. Martin, U.S. Pat. No. 2,039,256 discloses oxidizing and acid leaching of sludges containing selenium and tellurium. The acid leach is done in the presence of an oxidizing agent.

SUMMARY OF THE INVENTION

A flue dust or residue dust containing a major amount of lead oxide, a minor amount of tellurium oxide, the remainder being a minor amount of iron oxide, is treated by introducing the residue into a leach tank containing water, sulphuric acid and ferric sulphate. The sulphuric acid employed is in excess of that required to react with the lead and the tellurium in the residue. The ferric sulphate is added as an oxidizing agent. The solids (residue) added to the leach tank should represent between 20 to 40% of the total ingredients in the leach tank. The leach process takes place preferably at about 60° C. for a period of about 15 minutes. In the leach tank, the lead will be converted completely to insoluble lead sulphate while the tellurium remains in solution. The lead sulphate is removed from the tellurium solution by filtration and then the tellurium solution is treated in a tumbler with pieces of scrap iron to precipitate out metallic tellurium. Using this process approximately 99.5% of the original tellurium can be recovered at a purity of approximately 99%.

BRIEF DESCRIPTION OF THE DRAWING

The drawing attached hereto represents a flow sheet for the process of producing metallic tellurium from a flue dust containing the same.

DESCRIPTION OF THE PREFERRED EMBODIMENTS

Referring, in detail, to the drawing which represents a flow sheet of the process or method of the present invention, the "Residue" consists of flue dust obtained as lead-tellurium precipitator dust from the steel industry.

As indicated heretofore, it has been discovered that the addition of small amounts of tellurium to low carbon and alloy steels (as well as to copper) will greatly improve the machinability of these metals. One currently employed method of adding the tellurium to the steel is to first cover a molten bath of steel with a layer of molten lead. It is felt that the addition of tellurium directly to the molten steel is not feasible. The tellurium is added now to the layer of molten lead, after which a certain amount of tellurium migrates into the molten steel. However, at the time of adding the tellurium, there is considerable spattering, flashing, etc; all of which is recovered as flue dust. This flue dust contains approximately 60 to 99% PbO, 4 to 7% $TeO_2$, the remainder being iron oxide with small amounts of finely divided lead shot and some particles of metallic iron.

"Residue" is, therefore, passed through a "Magnetic Separation" step to remove any pieces of metallic iron prior to introduction into the "Leach" step; any conventional magnetic separation apparatus could be employed. At this point, we have, preferably, a charge of about 1000 lbs. of flue dust from which metallic iron has been removed; this charge will contain approximately 830 lbs.(average) of PbO approximately 45 lbs.(average) of $TeO_2$ and the rest iron oxide with small amounts of lead shot.

To the open "Leach" tank, water and sulphuric acid are added to satisfy two conditions; first of all, the total quantity of liquid in the leach tank should be, preferably, about 60 to 80% by weight; secondly, the sulphuric acid should be present in an amount equal to about 5 to 10% in excess of that stoichiometrically required to react with the lead and the tellurium. Finally 5% by weight (based upon the weight of liquids) of ferric sulphate is added as an oxidant. The reaction in the leach tank should take place at about 50° to 100° C., preferably about 60° C., for about 15 to 30 minutes. However, since the reactions taking place in the leach tank are exothermic, the addition of heat is generally unnecessary. The lead will be converted completely to insoluble lead sulphate:

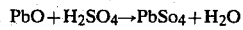

$$PbO + H_2SO_4 \rightarrow PbSO_4 + H_2O$$

It appears that it is necessary to convert all of the lead to lead sulphate for complete solubilization of the tellurium. Furthermore, it is theorized that the oxidizing presence of the ferric Sulphate converts the tellurium into the more soluble hexavalent state.

After about 15 minutes, the slurry from the "leach" tank is passed through a "Filter" to remove the lead sulphate. The filtrate is recovered as a "Tellurium Solution". The lead sulphate in the filter (any conventional filter, centrifuge, etc. can be employed) can be washed, repulped, refiltered and rewashed to produce a salable lead sulphate. The washings from the lead sulphate can be recovered as a "Make-Up Solution" to be added, as desired, as the water to be mixed with the sulphuric acid in the Leach step.

The Tellurium Solution is now introduced into a "Tumbler" which is physically similar to a rotary dryer. The Tumbler has a central screened or otherwise porous cylinder into which a charge of 60 to 100 lbs. of scrap iron is introduced, preferably about 80 lbs; the latter should represent a slight excess over the amount necessary to precipitate the tellurium from the solution. After the iron has been charged to the central cylinder, the latter is closed. After the tellurium solution has been charged to the Tumbler, the latter is closed and sealed. The Tumbler is now rotated (or otherwise agitated) so that the solution can slosh through the scrap iron to precipitate out the Tellurium by simple replacement with the iron. The temperature during the tumbling action will be about 60° C., but can be from ambient to 100° C. Of course, instead of the "Tumbler", it is possible to employ any other type of vessel where the tellurium solution can be agitated in the presence of iron particles.

After tumbling for about 5 to 20 minutes, the solution is passed through a "Magnetic Separation" and then to a "Plate & Frame Filter". The magnetic separation can be effected by a revolving permanent magnetic which merely removes small particles of iron which might fall out of or through the center basket in the tumbler; from time to time, it will be necessary to scrape the iron particles from the revolving magnet, but this iron can be added to the "Steel Wool" chamber as will hereinafter appear.

Essentially all of metallic tellurium produced in the Tumbler will be recovered in the Plate & Frame Filter; however, in the event that there is any unreacted tellurium solution, the liquid flowing from the plate and front filter is caused to pass through a separate "Steel Wool" vessel containing finely divided iron, such as steel wool, the latter being more highly reactive to the tellurium solution than the iron added to the tumbler. The iron removed from the "Magnetic Separation" following the "Tumbler" can also be added to the "Steel Wool" vessel. Tellurium is removed from the Steel Wool vessel from time to time.

The liquid exiting the "Steel Wool" vessel is essentially ferrous sulphate which can be recovered from the solution by evaporation and sold as such, or part of which can be oxidized to ferric sulphate as the source of this compound required for the "Leach" step.

The tellurium in the plate and frame filter can be washed as desired; the washings being saved, as desired, for use in the process, with or without evaporation. Analysis of the product from the plate and frame filter shows it to be about 99% metallic tellurium and about 1% lead, with traces of iron. Recovery of metallic tellurium based upon the TeO$_2$ in the original Residue is in excess of 95%. The tellurium can be mixed with corn starch, as a binder, briquetted and sold back to the steel industry from which the original residue was obtained.

EXAMPLE 1

Following the general procedure outlined above, 1000 lbs. of Residue, after magnetic separation, were introduced to the leach tank. Analysis of this residue showed that it contained 70.34% PbO, or 703.4 lbs. of PbO; 3.69% (as TeO$_2$) or 36.9 lbs. of Te. The solids content for the leach tank was selected to be about 22% by weight of the total quantity of materials in the tank. Water was added in the amount of 374.2 gallons (3120 lbs.). Concentrated sulphuric acid was added in the amount of 25.8 gallons (394.5 lbs.) which is 10% in excess of that required to react with lead and tellurium. Finally, 166 lbs. of Ferric Sulphate were added. The temperature was brought to about 60° C. and the leach process was allowed to continue for about 30 minutes. After removal of the lead sulphate by filtration, the tellurium solution was added to the tumbler (without cooling) along with 81.2 lbs. of metallic iron. The tumbling action was allowed to proceed for about 20 minutes. Metallic Tellurium was recovered from the plate and frame filter in the amount of 36.7 lbs. representing a 99.5% recovery from the initial residue. Analysis of the recovered tellurium showed that it was 99% pure, the remaining 1% being lead.

Whereas the present invention has been described in particular relation to the drawing attached hereto, it should be understood that other and further modifications, apart from those shown or suggested herein, may be made within the spirit and scope of this invention.

What is claimed is:

1. A method of recovering metallic tellurium from a residue dust containing a major amount of lead oxide, a minor amount of tellurium oxide and a minor amount of iron oxide which comprises introducing the residue into a leach tank containing water, sulphuric acid and ferric sulphate, reacting the residue with the sulphuric acid and the ferric sulphate in the leach tank to produce lead sulphate and a tellurium solution, removing the lead sulphate and tellurium solution from the leach tank and separating the lead sulphate from the tellurium solution, adding the separated tellurium solution to a tumbler containing particles of metallic iron, agitating the tumbler so that the tellurium solution reacts with the iron to produce ferrous sulphate and metallic tellurium, withdrawing the mixture of ferrous sulphate and metallic tellurium from the tumbler and separating out the ferrous sulphate to recover essentially pure metallic tellurium.

2. A method of recovering metallic tellurium as set forth in claim 1 wherein the sulphuric acid is present in the leach tank in an amount equal to about 5 to 10% by weight in excess of that stoichiometrically required to react with the lead and the tellurium, the ferric sulphate being added in an amount equal to about 5% by weight of the liquids.

3. A method of recovering metallic tellurium as set forth in claim 1 wherein the reaction in the leach tank is conducted at a temperature of about 50° to 100° C. for about 10 to 30 minutes.

4. A method of recovering metallic tellurium as set forth in claim 1 wherein the ferrous sulphate which is separated from the metallic tellurium is oxidized to produce ferric sulphate to be used in the leach tank.

5. A method of recovering metallic tellurium as set forth in claim 1 wherein the residue contains about 65 to 90% by weight of lead oxide, about 5 to 7% by weight of tellurium oxide, and the remainder iron oxide.

6. A method of recovering metallic tellurium as set forth in claim 1 wherein the residue added to the leach tank represents 20 to 40 percent by weight of the total materials in the leach tank.

* * * * *